(12) United States Patent
Hunn

(10) Patent No.: US 7,657,134 B2
(45) Date of Patent: Feb. 2, 2010

(54) IMPACT-SENSING THERMAL INSULATION SYSTEM AND MISSILE INCORPORATING SAME

(75) Inventor: David L. Hunn, Kennedale, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 4 days.

(21) Appl. No.: 12/172,347

(22) Filed: Jul. 14, 2008

(65) Prior Publication Data

US 2009/0087135 A1 Apr. 2, 2009

Related U.S. Application Data

(63) Continuation-in-part of application No. 11/169,607, filed on Jun. 29, 2005, now abandoned.

(51) Int. Cl.
*G02B 6/00* (2006.01)
(52) U.S. Cl. .......................................... 385/12; 385/13
(58) Field of Classification Search .............. 385/12–13
See application file for complete search history.

(56) References Cited

U.S. PATENT DOCUMENTS

| | | | | |
|---|---|---|---|---|
| 3,626,240 | A * | 12/1971 | MacIntyre | 315/149 |
| 3,717,098 | A * | 2/1973 | Davis et al. | 102/206 |
| 4,572,950 | A * | 2/1986 | Harmer | 250/227.14 |
| 4,618,764 | A * | 10/1986 | Harmer | 250/227.14 |
| 6,321,654 | B1 * | 11/2001 | Robinson | 102/251 |
| 7,082,079 | B2 * | 7/2006 | Woo | 367/149 |
| 7,098,455 | B2 * | 8/2006 | Shinada et al. | 250/310 |
| 2006/0053534 | A1 * | 3/2006 | Mullen | 2/456 |
| 2006/0118992 | A1 * | 6/2006 | Chang et al. | 264/138 |

FOREIGN PATENT DOCUMENTS

GB EP 0640824 A1 * 3/1995

* cited by examiner

*Primary Examiner*—Brian M. Healy
*Assistant Examiner*—Guy G Anderson
(74) *Attorney, Agent, or Firm*—Davis Patent Services, LLC

(57) ABSTRACT

An impact-sensing, thermal insulation system includes a light source; an optical detector; and an optically-transmissive insulation optically coupled with the light source and the optical detector, the optically-transmissive insulation being operably associated with an outer surface of a pressure vessel. A missile includes a body; a propulsion system including a pressure vessel having an outer surface; and an impact-sensing, thermal insulation system operably associated with the outer surface of the pressure vessel. The impact-sensing, thermal insulation system includes a light source; an optical detector; and an optically-transmissive insulation optically coupled with the light source and the optical detector, the optically-transmissive insulation being operably associated with the outer surface of the pressure vessel.

20 Claims, 7 Drawing Sheets

IMPACT-SENSING THERMAL INSULATION SYSTEM AND MISSILE INCORPORATING SAME

CROSS-REFERENCE TO RELATED APPLICATIONS

This application is a continuation-in-part of commonly-owned, co-pending U.S. patent application Ser. No. 11/169,607, entitled "Fiber Optic Impact Sensing System and Method of Using Same" by inventor David L. Hunn, filed on 29 Jun. 2005, which is incorporated herein by reference for all purposes.

BACKGROUND

1. Field of the Invention

The present invention relates to an impact-sensing thermal insulation system.

2. Description of Related Art

Missiles, rockets, and other such vehicles use propellants that are often stored in pressure vessels within the vehicles. It is often desirable to thermally insulate such pressure vessels to protect the pressure vessels from aerodynamic heating during flight, which can undermine the structural integrity of the pressure vessels.

Moreover, it is important to avoid mechanically damaging pressure vessels. It is, however, inevitable that some damage will occur to such members during use. Sometimes it is not known that damage has occurred to a pressure vessel. In such situations, the pressure vessel may fail upon use without warning. At other times, it may be known that damage has occurred but it is not known whether the damage is extensive enough to compromise the structural integrity of the pressure vessel. Often, sophisticated testing is required to determine whether the pressure vessel is structurally sound for its intended purpose. Accordingly, it is often desirable to monitor the structural "health" of such pressure vessels so that the likelihood of a catastrophic failure can be minimized.

The structural integrity of composite pressure vessels, such as those made from materials comprising strands or filaments of structural fibers disposed in a polymeric matrix, may be particularly compromised if such a pressure vessel is mechanically damaged. Optical sensor arrays have been developed that can be embedded at discrete locations within a composite member to measure the internal strain of the member during use. Such sensors, however, provide no information as to the structural health of the member prior to use, because an unacceptable strain level may only be encountered during use. Moreover, these sensors fail to provide any information concerning external, impact-induced damage because they are disposed within the member.

While there are many thermal insulation systems well known in the art, considerable room for improvement remains.

DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
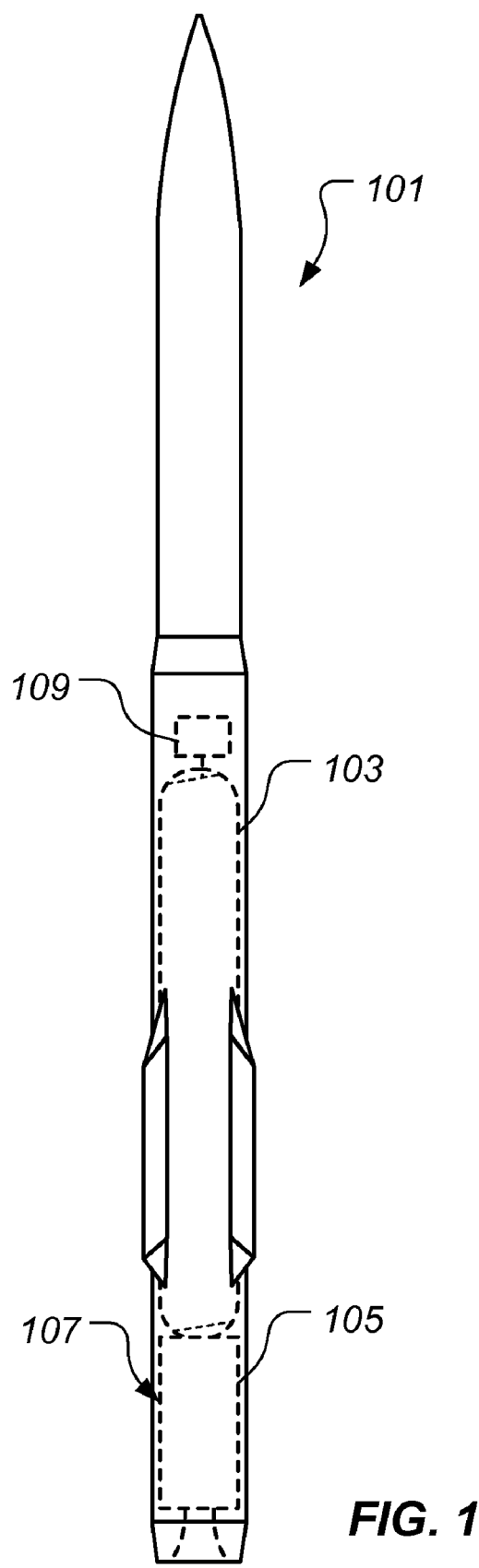
FIG. 1 is a stylized, side, elevational view of a missile incorporating an impact-sensing, thermal insulation system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention represents an impact-sensing, thermal insulation system for a pressure vessel used in the propulsion system of a missile or rocket. As used herein, the term "missile" means a missile, rocket, or other such vehicle. The system includes an optically-transmissive, thermal insulation, which comprises one or more optical fibers wound about the pressure vessel to form a plurality of adjacent layers. The one or more optical fibers may be disposed adjacent an outer surface of the pressure vessel or may be embedded in the outer surface of the pressure vessel. Light is propagated through the one or more optical fibers. If the member suffers an impact, one or more of the optical fibers are compromised to an extent corresponding to the intensity of the impact, resulting in a corresponding decrease in the amplitude of light propagated through the optical fibers. The level of propagated light is monitored to determine if an impact has occurred and the magnitude of the impact.

FIG. 1 depicts a missile 101 comprising a pressure vessel 103 for containing propellant in fluid communication with a motor 105. Pressure vessel 103 and motor 105 comprise a propulsion system 107 of missile 101, which propels missile 101 during flight.

Figure 2:
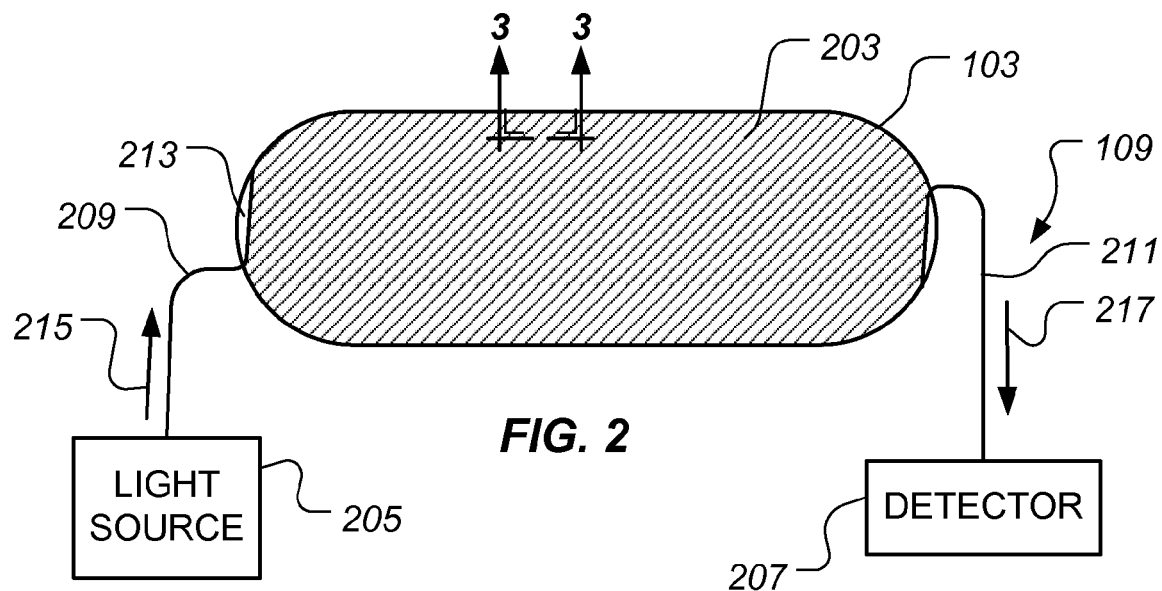
FIG. 2 is a stylized, schematic representation of a first illustrative embodiment of the impact-sensing, thermal insulation system, applied to a pressure vessel of the missile of FIG. 1.

FIG. 2 depicts a first illustrative embodiment of an impact-sensing, thermal insulation system 109 operably associated with pressure vessel 103. In its most basic form, impact-sensing, thermal insulation system 109 includes an optically-transmissive insulation 203, a light source 205, a detector 207, an optical fiber 209 extending between insulation 203 and light source 205, and an optical fiber 211 extending between insulation 203 and detector 207. Note that insulation 203 is represented as a hatched area in FIG. 2. Insulation 203 comprises a plurality of layers of one or more optical fibers disposed about pressure vessel 103, as is discussed in greater detail herein. Insulation 203 is disposed adjacent an outer surface 213 of pressure vessel 103. Light from light source 205 propagates through optical fiber 209, insulation 203, and optical fiber 211 to detector 207, as indicated by arrows 215, 217. Note that light emitted from light source 205 may exhibit wavelengths within the human visual spectrum or may exhibit wavelengths outside the human visible spectrum.

Figure 3:
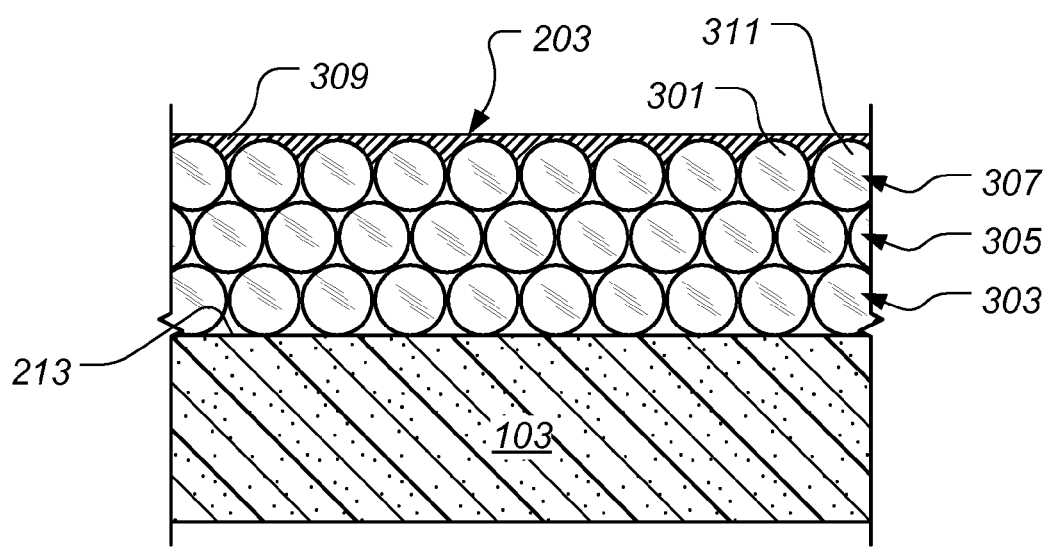
FIG. 3 is a cross-sectional view, taken along the line 3-3 of FIG. 2, of a portion of the pressure vessel and an illustrative configuration of a optically-transmissive insulation of the impact-sensing, thermal insulation system of FIG. 2, illustrating one particular placement configuration of an optical fiber of the optically-transmissive insulation.

FIG. 3 depicts one particular exemplary configuration of optically-transmissive insulation 203. In the illustrative configuration, an optical fiber 301 is wound about pressure vessel 103 to form a plurality of adjacent layers 303, 305, and 307. It should be noted that optical fiber 301 may comprise a plurality of optical fibers connected in an end-to-end fashion. As the number of layers, such as layers 303, 305, and 307, is implementation-specific, the present invention contemplates any suitable number of layers of optical fiber 301. A first end of optical fiber 301 is in optical communication with optical fiber 209 (shown in FIG. 2) and a second end of optical fiber 301 is in optical communication with optical fiber 211 (shown in FIG. 2). In the illustrative configuration, a protective coating 309 is disposed over layer 307 to protect optical fiber 301 from inadvertent damage. Protective coating 309 may comprise, for example, a paint or a syntactic foam. Other configurations of optically-transmissive insulation 203 are contemplated by the present invention and examples of such configurations are discussed herein and shown in the drawings.

Figure 4A:
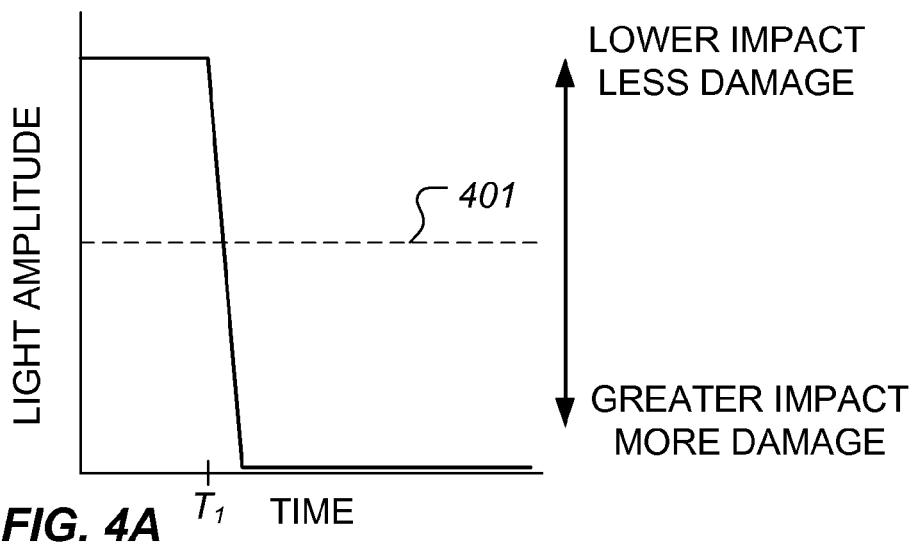
FIGS. 4A-4C are graphical representations of the light amplitude detected by a detector of the impact-sensing, thermal insulation system over a period of time in which an impact occurs for various scenarios.
Figure 4B:
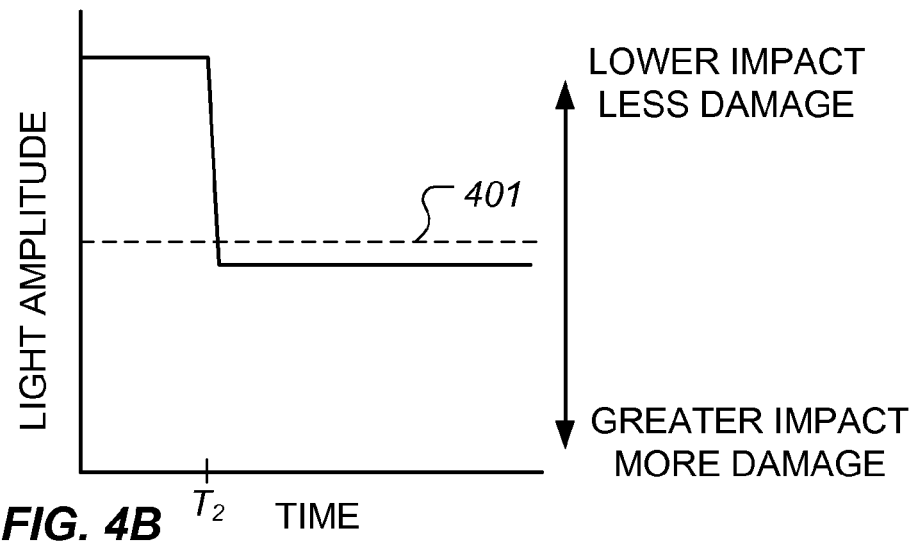
Figure 4C:
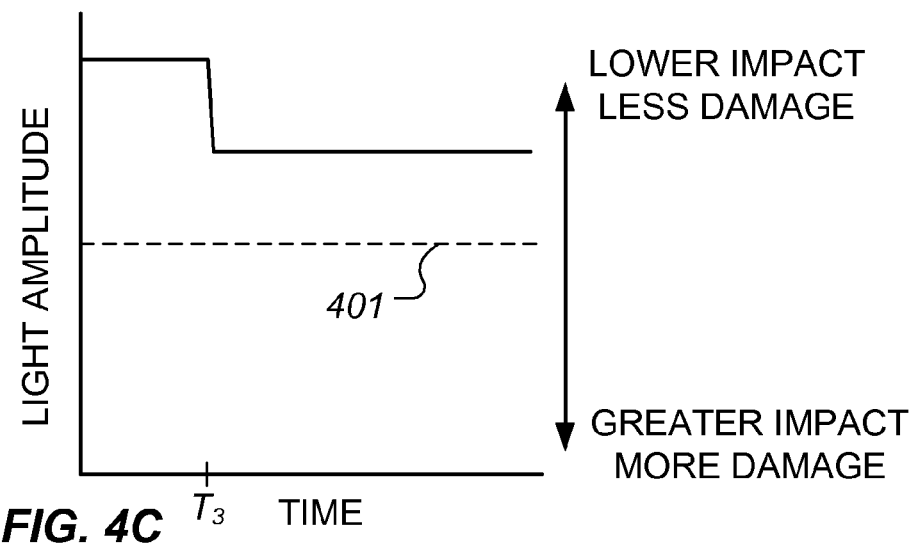

Generally, if pressure vessel 103 sustains an impact, optical fiber 301 of optically-transmissive insulation 203 will be damaged to some degree corresponding to the intensity of the impact. The amount of damage to optical fiber 301 is, in general, inversely proportional to the amplitude of light propagated through optical fiber 301. FIGS. 4A-4C illustrate three particular exemplary scenarios that might be encountered during the operation of system 109 (shown in FIG. 2). Each of FIGS. 4A-4C provides a graphical representation of the light amplitude detected by detector 207 over a period of time in which an impact occurs. Also, shown in each of FIGS. 4A-4C is a graphical representation of a predetermined threshold value 401. Light amplitudes detected by detector 207 that are greater than threshold value 401 are interpreted as resulting from impacts that will not structurally compromise pressure vessel 103 and are, thus, acceptable. It should be noted that light amplitudes detected by detector 207 may be considered acceptable if they are greater than the threshold 401 within a certain tolerance band, or, in other words, greater than about the threshold 401. Light amplitudes detected by detector 207 that are less than threshold 401 are considered unacceptable, as the light amplitudes correspond to impacts that may structurally compromise pressure vessel 103. Note that light amplitudes detected by detector 207 may be considered unacceptable if they are less than the threshold 401 within a certain tolerance band, or, in other words, less than about the threshold 401.

FIG. 4A illustrates a scenario wherein pressure vessel 103 sustains an impact of sufficient magnitude to severely damage optical fiber 301 (shown in FIG. 3). In this example, optical fiber 301 is damaged at about time $T_1$ to a degree that little light is propagated therethrough and detected by detector 207. The light amplitude detected by detector 207 after time $T_1$ falls well below threshold value 401. Accordingly, the structural integrity of pressure vessel 103 has been sufficiently compromised, due to the impact, that pressure vessel 103 must be replaced or repaired. Detector 207 is operable to provide an indication that a significant impact has occurred.

FIG. 4B illustrates a situation wherein pressure vessel 103 sustains an impact of sufficient magnitude to damage optical fiber 301 to a lesser degree than shown in FIG. 4A. In this example, optical fiber 301 is damaged at about time $T_2$ such that the light amplitude detected by detector 207 falls just below threshold value 401. Even though optical fiber 301 is not as severely damaged as in the example of FIG. 4A, the light amplitude detected by detector 207 indicates that the structural integrity of pressure vessel 103 has been sufficiently compromised to warrant replacement or repair. Detector 207 is operable to provide an indication that a significant impact has occurred.

FIG. 4C illustrates a scenario wherein pressure vessel 103 sustains an impact of sufficient magnitude to damage optical fiber 301 but to a lesser degree than shown in FIG. 4B. In this example, optical fiber 301 is damaged at about time $T_3$ such that the light amplitude detected by detector 207 falls above threshold value 401. Even though optical fiber 301 is somewhat damaged, the light amplitude detected by detector 207 indicates that the structural integrity of pressure vessel 103 has not been sufficiently compromised to warrant replacement or repair. Detector 207 is operable to provide an indication that an insignificant impact has occurred.

Figure 5:
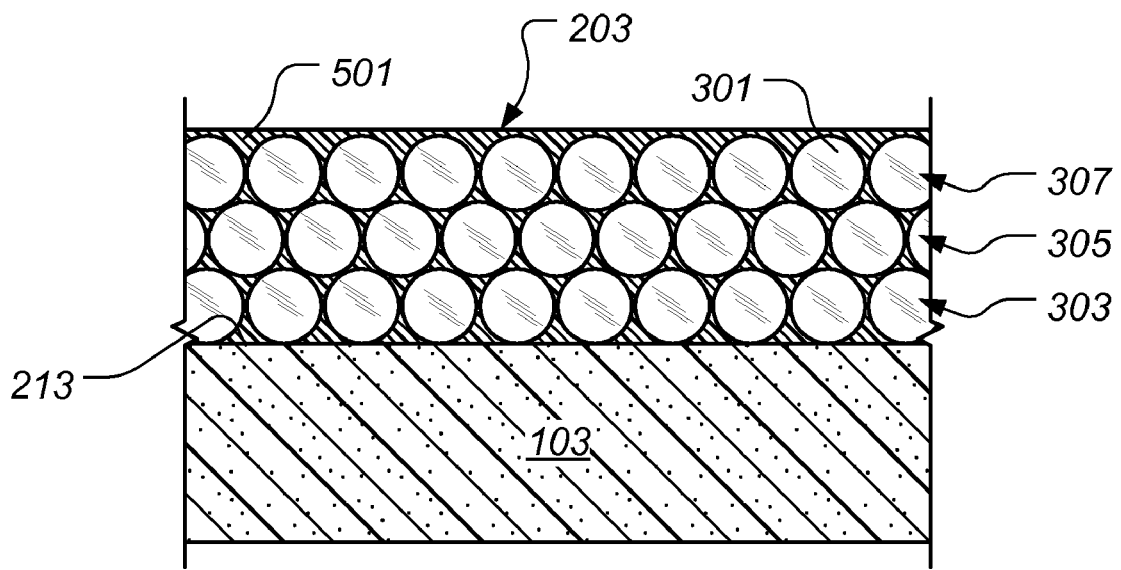
FIGS. 5-8 are cross-sectional views, corresponding to the view of FIG. 3, illustrating alternative placement configurations of the optical fiber of the optically-transmissive insulation.
Figure 6:
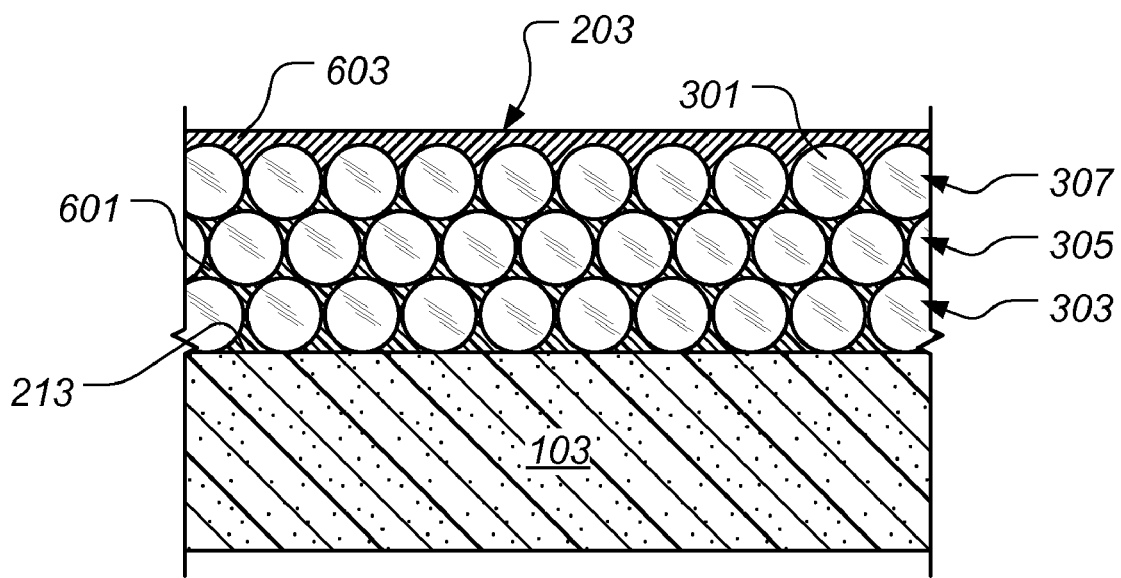

FIGS. 5-8 depict configurations of optically-transmissive insulation 203 alternative to the configuration shown in FIG. 3. In the configuration of FIG. 5, optical fiber 301 is bonded to outer surface 213 of pressure vessel 103 by a resin or adhesive 501, which substantially completely envelopes optical fiber 301. In the configuration of FIG. 6, optical fiber 301 is bonded to outer surface 213 of pressure vessel 103 by a resin or adhesive 601. Many composite pressure vessels such as pressure vessel 103 are fabricated using a filament winding process. In one embodiment, optical fiber 301 is applied to outer surface 213 of pressure vessel 103 during the filament winding process, such that resin 601 is applied to optical fiber 301 prior to being applied to outer surface 213. When assembled pressure vessel 103 is cured, optical fiber 301 is bonded to outer surface 213. In the embodiment illustrated in FIG. 6, a thin, protective covering or layer 603 is disposed over layer 307 of optical fiber 301 to protect optical fiber 301 from incidental damage. Protective layer 603 may comprise, for example, a paint or a syntactic foam.

Figure 7:
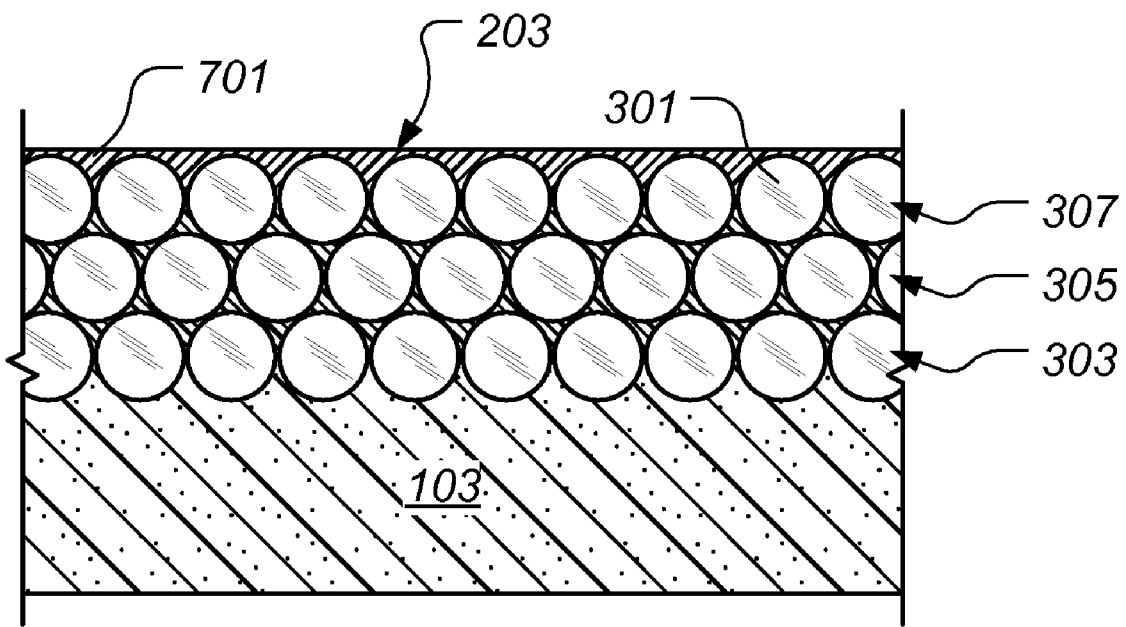
Figure 8:
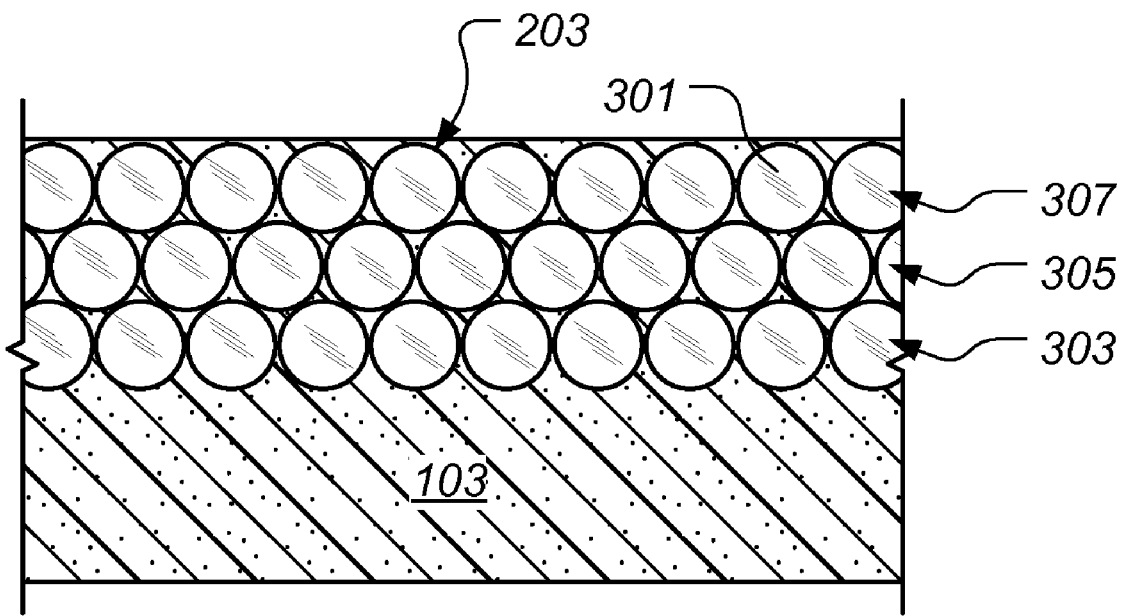

As shown in FIG. 7, one or more layers 303, 303, and 307 of optical fiber 301 may partially extend into pressure vessel 103, especially if co-applied using a filament winding process. In such embodiments, a protective layer 701 may be disposed over optical fiber 301, as discussed above. Alternatively, all layers 303, 305, and 307 of optical fiber 301 may be substantially fully embedded in pressure vessel 103, as shown in FIG. 8. Other configurations are contemplated by the present invention.

Figure 9:
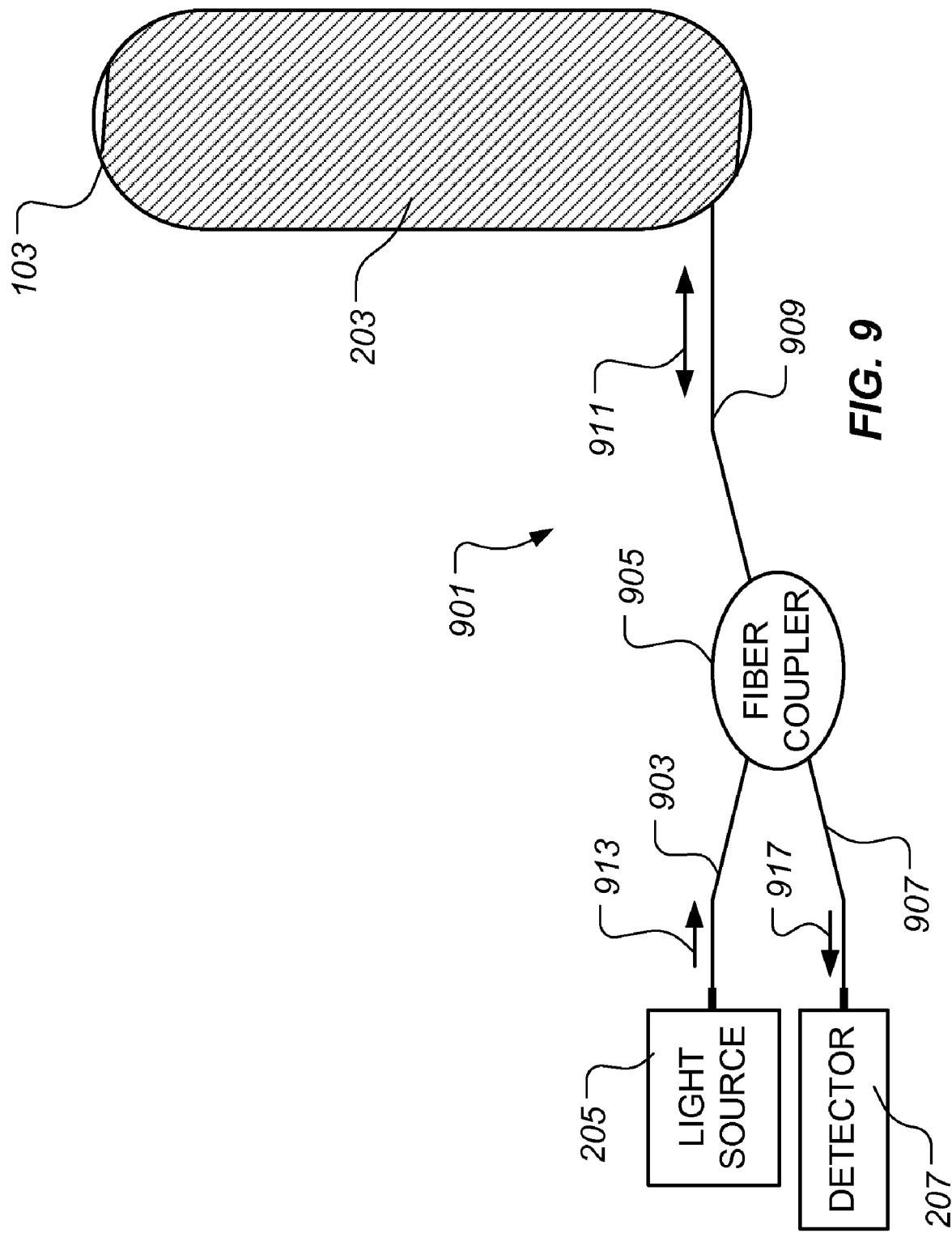
FIG. 9 is a stylized, schematic representation of a second illustrative embodiment of an impact-sensing, thermal insulation system, applied to a pressure vessel of the missile of FIG. 1.

FIG. 9 depicts a second, illustrative embodiment of an impact-sensing, thermal insulation system 901. In this embodiment, light source 205 is optically coupled by an optical fiber 903 to a fiber coupler 905. Detector 207 is optically coupled by an optical fiber 907 to fiber coupler 905. Fiber coupler 905 optically combines optical fibers 903, 907 into a single optical fiber 909. Optical fiber 909 operates in a "duplex" or "bidirectional" fashion, allowing light to independently propagate in two directions, as indicated by arrow 911. Fiber coupler 905 is optically coupled with optically-transmissive insulation 203, shown as hatched area in FIG. 9, via optical fiber 909.

Light is emitted from light source 205 and propagates (as indicated by arrow 913) through optical fiber 903 to fiber coupler 905. The light is then propagated through optical fiber 909 to a distal end of optical fiber 301 (shown in FIGS. 3 and 5-8) of optically-transmissive insulation 203, where it is reflected. The reflected light then propagates through optical fiber 301 of insulation 203 and optical fiber 909 to fiber coupler 905, where the reflected light is directed into optical fiber 907. The reflected light propagates through optical fiber 907 (as indicated by arrow 917) to detector 207, where the amplitude of the reflected light is detected.

Figure 10:
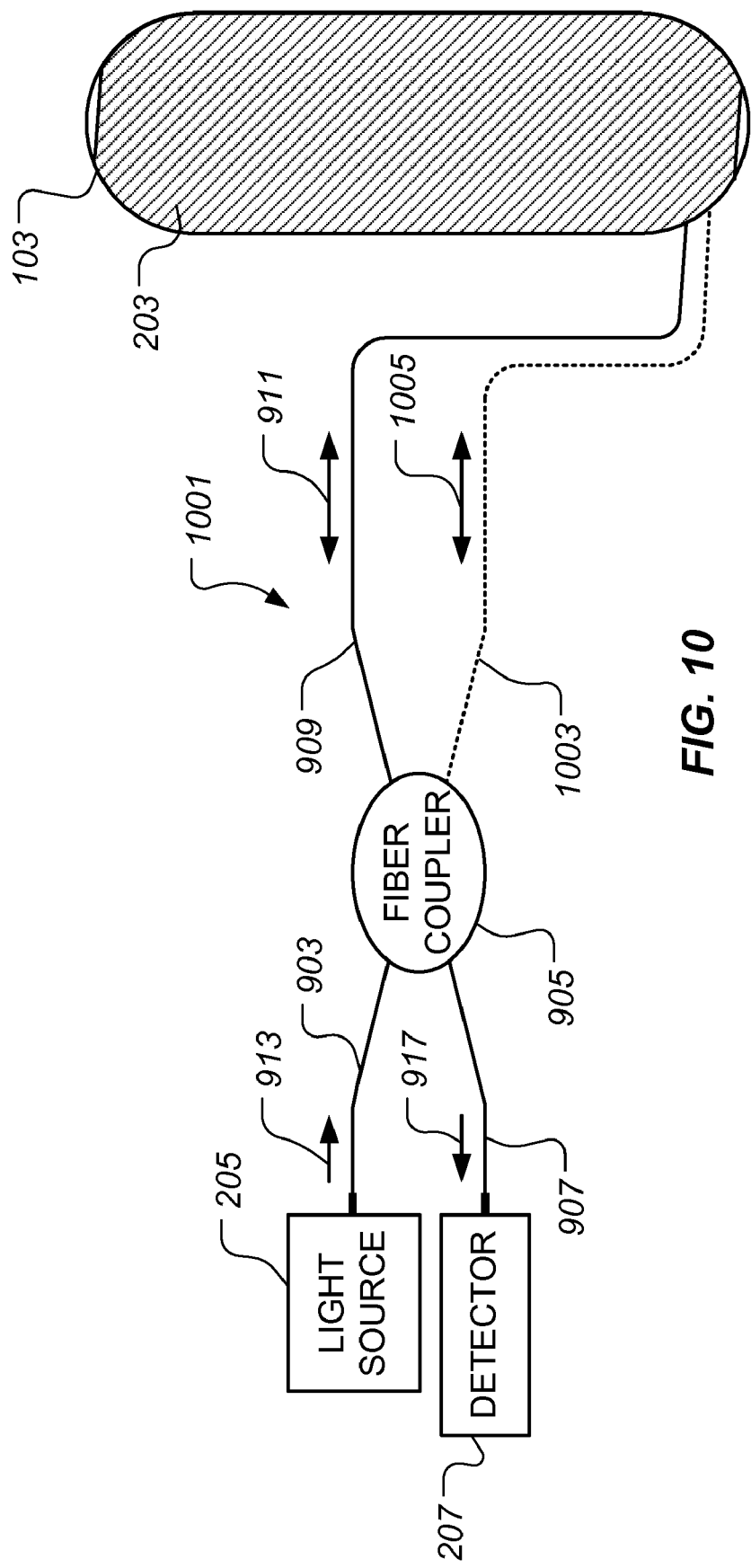
FIG. 10 is a stylized, schematic representation of a third illustrative embodiment of an impact-sensing, thermal insulation system, applied to a pressure vessel of the missile of FIG. 1.

FIG. 10 depicts a third illustrative embodiment of an impact-sensing, thermal insulation system 1001 according to the present invention. System 1001 is substantially identical to system 901 of FIG. 9 except a second optical fiber 1003 (shown as a broken line in FIG. 10) is included to provide a redundant sensing capability. In this embodiment, optical fiber 301 of optically-transmissive insulation 203 is supplemented by a second optical fiber, such as optical fiber 311 of FIG. 3. Note that optical fiber 311 may be on the same layer, e.g., layer 303, 305, or 307 as optical fiber 301 or may be on a different layer and may be in any desired position on the layer. Light from light source 205 propagates bidirectionally through both optical fibers 909, 1003, as indicated by arrows 911 and 1005, into optical fibers 301 and 311, respectively of insulation 203. The light is reflected from distal ends of optical fibers 301 and 311, then propagates back through optical fibers 301 and 311 to optical fibers 909 and 1003. Detector 207 detects the reflected light amplitude from both optical fibers 909 and 1003.

The present invention provides significant advantages, including: (1) insulating a pressure vessel of a missile while providing the ability to assure the structural health of the pressure vessel prior to its use; and (2) insulating a pressure vessel of a missile while providing the ability to sense an external impact to the pressure vessel that may induce damage to the pressure vessel.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

What is claimed is:

1. An impact-sensing, thermal insulation system, comprising:
   a light source;
   an optical detector; and
   an optically-transmissive insulation optically coupled with the light source and the optical detector, the optically-transmissive insulation being operably associated with an outer surface of a pressure vessel.

2. The impact-sensing, thermal insulation system, according to claim 1, wherein the optically-transmissive insulation comprises:
   an optical fiber wound about the pressure vessel to form a plurality of adjacent layers.

3. The impact-sensing, thermal insulation system, according to claim 2, wherein the light source is optically coupled with a first end of the optical fiber of the optically-transmissive insulation and the optical detector is optically coupled with a second end of the optical fiber of the optically-transmissive insulation.

4. The impact-sensing, thermal insulation system, according to claim 2, further comprising:
   a fiber coupler optically coupled with the light source, the optical detector, and the optical fiber of the optically-transmissive insulation,
   wherein the optical fiber of the optically-transmissive insulation operates in a bidirectional fashion.

5. The impact-sensing, thermal insulation system, according to claim 4, wherein the optically-transmissive insulation further comprises:
   a second optical fiber optically coupled with the fiber coupler and operably associated with the outer surface of the structure.

6. The impact-sensing, thermal insulation system, according to claim 2, wherein the optically-transmissive insulation comprises:
   a cover for protecting the optical fiber.

7. The impact-sensing, thermal insulation system, according to claim 1, wherein the optical detector is operable to compare a predetermined threshold value to an amplitude of light outputted from the optically-transmissive insulation.

8. The impact-sensing, thermal insulation system, according to claim 7, wherein the optical detector is operable to provide an indication of a significant impact if the amplitude of light outputted from the optically-transmissive insulation is less than about the predetermined threshold value.

9. The impact-sensing, thermal insulation system, according to claim 7, wherein the optical detector is operable to provide an indication of an insignificant impact if the amplitude of light outputted from the optically-transmissive insulation is greater than about the predetermined threshold value.

10. A missile, comprising:
    a body;
    a propulsion system including a pressure vessel having an outer surface; and
    an impact-sensing, thermal insulation system operably associated with the outer surface of the pressure vessel, the impact-sensing, thermal insulation system comprising:
    a light source;
    an optical detector; and
    an optically-transmissive insulation optically coupled with the light source and the optical detector, the optically-transmissive insulation being operably associated with the outer surface of the pressure vessel.

11. The missile, according to claim 10, wherein the optically-transmissive insulation comprises:
   an optical fiber wound about the pressure vessel to form a plurality of adjacent layers.

12. The missile, according to claim 11, wherein the optical fiber of the optically-transmissive insulation is disposed proximate the outer surface of the structure.

13. The missile, according to claim 11, wherein the optical fiber of the optically-transmissive insulation is attached to the outer surface of the structure.

14. The missile, according to claim 11, further comprising a protective layer disposed over the optical fiber of the optically-transmissive insulation.

15. The missile, according to claim 11, wherein the light source is optically coupled with a first end of the optical fiber of the optically-transmissive insulation and the optical detector is optically coupled with a second end of the optical fiber of the optically-transmissive insulation.

16. The missile, according to claim 11, further comprising:
   a fiber coupler optically coupled with the light source, the optical detector, and the optical fiber of the optically-transmissive insulation,
   wherein the optical fiber of the optically-transmissive insulation operates in a bidirectional fashion.

17. The missile, according to claim 16, wherein the optically-transmissive insulation further comprises:
   a second optical fiber optically coupled with the fiber coupler and operably associated with the outer surface of the pressure vessel.

18. The missile, according to claim 11, wherein the optical detector is operable to compare a predetermined threshold value to an amplitude of light outputted from the optical fiber of the optically-transmissive insulation.

19. The missile, according to claim 18, wherein the optical detector is operable to provide an indication of a significant impact if the amplitude of light outputted from the optical fiber of the optically-transmissive insulation is less than about the predetermined threshold value.

20. The missile, according to claim 18, wherein the optical detector is operable to provide an indication of an insignificant impact if the amplitude of light outputted from the optical fiber of the optically-transmissive insulation is greater than about the predetermined threshold value.

* * * * *